United States Patent
Imperia et al.

(10) Patent No.: US 10,985,987 B2
(45) Date of Patent: *Apr. 20, 2021

(54) CONTROL OF ACTIVITIES EXECUTED BY ENDPOINTS BASED ON CONDITIONS INVOLVING AGGREGATED PARAMETERS

(71) Applicant: International Business Machines Corporation, Armonk, NY (US)

(72) Inventors: Marco Imperia, Rome (IT); Luigi Pichetti, Rome (IT); Marco Secchi, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,445

(22) Filed: Mar. 23, 2020

(65) Prior Publication Data

US 2020/0220781 A1 Jul. 9, 2020

Related U.S. Application Data

(63) Continuation of application No. 15/407,712, filed on Jan. 17, 2017, now Pat. No. 10,666,515.

(51) Int. Cl.
*G06F 15/16* (2006.01)
*H04L 12/24* (2006.01)
(Continued)

(52) U.S. Cl.
CPC .......... *H04L 41/0893* (2013.01); *G06F 11/30* (2013.01); *G06F 11/3006* (2013.01);
(Continued)

(58) Field of Classification Search
CPC ..... H04L 41/0893; H04L 43/08; H04L 67/22; H04L 67/2833; G06F 11/30
See application file for complete search history.

(56) References Cited

U.S. PATENT DOCUMENTS 8,688,820 B1 4/2014 Bhogi et al.
8,775,625 B2 7/2014 Narayanaswamy et al.
(Continued)

OTHER PUBLICATIONS

IBM Endpoint Manager for Lifecycle Management, 2012, URL:http://www.slideshare.net/spradlink/ibm-endpoint-manager-for-lifecycle-management, 25 pages.
Manoel et al., Developing Workflows and Automation Packages for IBM Tivoli Intelligent Orchaestrator V3.1, Redbooks, © Copyright IBM Corp. 2004, 2006, 688 pages.
(Continued)

*Primary Examiner* — Ryan J Jakovac
(74) *Attorney, Agent, or Firm* — Schmeiser, Olsen & Watts, LLP; William Hartwell

(57) ABSTRACT

A method and system. One or more local parameters are collected from one or more corresponding endpoints. Each policy of one or more policies includes an indication of one or more activities for execution on the corresponding endpoints. At least one of the activities of the policies is conditioned by a condition based on one or more aggregated parameters. Each aggregated parameter depends on at least one of the one or more local parameters. The local parameters are aggregated into the aggregated parameters. Each aggregated parameter is distributed at least to the corresponding endpoints of each policy including any activity conditioned on the aggregated parameter. At least the corresponding policies are sent to the endpoints to cause each endpoint to apply each corresponding policy by collecting any aggregated parameters of the policy on the endpoint and executing the activities of the policy according to the corresponding aggregated parameters.

20 Claims, 8 Drawing Sheets

(51) Int. Cl.
*H04L 29/08* (2006.01)
*G06F 11/30* (2006.01)

(52) U.S. Cl.
CPC ...... *G06F 11/3072* (2013.01); *H04L 41/0853* (2013.01); *H04L 67/22* (2013.01); *H04L 67/2833* (2013.01)

(56) References Cited

U.S. PATENT DOCUMENTS

| | | |
|---|---|---|
| 9,098,333 B1 | 8/2015 | Obrecht et al. |
| 9,887,931 B1 | 2/2018 | Uppal et al. |
| 2012/0130987 A1 | 5/2012 | Bose et al. |
| 2013/0198800 A1 | 8/2013 | Bezilla et al. |
| 2015/0149609 A1 | 5/2015 | Zou et al. |
| 2015/0363282 A1 | 12/2015 | Rangasamy |
| 2018/0205610 A1 | 7/2018 | Imperia et al. |

OTHER PUBLICATIONS

Office action (dated Oct. 2, 2018), U.S. Appl. No. 15/407,712, filed Jan. 17, 2017.
Amendment (dated Dec. 31, 2018), U.S. Appl. No. 15/407,112, filed Jan. 17, 2017.
Final Office action (dated Apr. 30, 2019), U.S. Appl. No. 15/407,712, filed Jan. 17, 2017.
Final amendment (dated Jun. 19, 2019), U.S. Appl. No. 15/407,712, filed Jan. 17, 2017.
Advisory action (dated Jul. 2, 2019), U.S. Appl. No. 15/407,712, filed Jan. 17, 2017.
Notice of appeal (Jul. 29, 2019), U.S. Appl. No. 15/407,712, filed Jan. 17, 2017.
Appeal Brief (Sep. 27, 2019), U.S. Appl. No. 15/407,712, filed Jan. 17, 2017.
Notice of allowance (dated Jan. 22, 2020), U.S. Appl. No. 15/407,712, filed Jan. 17, 2017.

CONTROL OF ACTIVITIES EXECUTED BY ENDPOINTS BASED ON CONDITIONS INVOLVING AGGREGATED PARAMETERS

This application is a continuation application claiming priority to Ser. No. 15/407,712, filed Jan. 17, 2017, now U.S. Pat. No. 10,666,515 issued May 26, 2020.

TECHNICAL FIELD

The present invention relates to control of activities executed by endpoints.

BACKGROUND

The management of endpoints of a data processing environment plays a key role several contexts, especially in large organizations wherein the number of the endpoints may become very high (for example, up to some hundreds of thousands). For this purpose, various resource management tools are available for facilitating the management of the endpoints.

However, current approaches to management of endpoints are not scalable and reactive.

SUMMARY

The present invention provides a method and associated system and computer program product. One or more processors of a computer system store one or more policies. Each policy comprises an indication of one or more activities for execution on one or more corresponding endpoints. At least one of the activities of the policies is conditioned by a condition based on one or more aggregated parameters. Each aggregated parameter depends on one or more local parameters of a corresponding group of a plurality of the endpoints. The one or more processors collect the local parameters from the corresponding endpoints. The one or more processors aggregate the local parameters into the aggregated parameters. The one or more processors distribute each aggregated parameter at least to the corresponding endpoints of each policy comprising any activity conditioned on the aggregated parameter. The one or more processors send at least the corresponding policies to the endpoints to cause each endpoint to apply each corresponding policy by collecting any aggregated parameters of the policy on the endpoint and executing the activities of the policy according to the corresponding aggregated parameters.

DETAILED DESCRIPTION

Figure 1A:
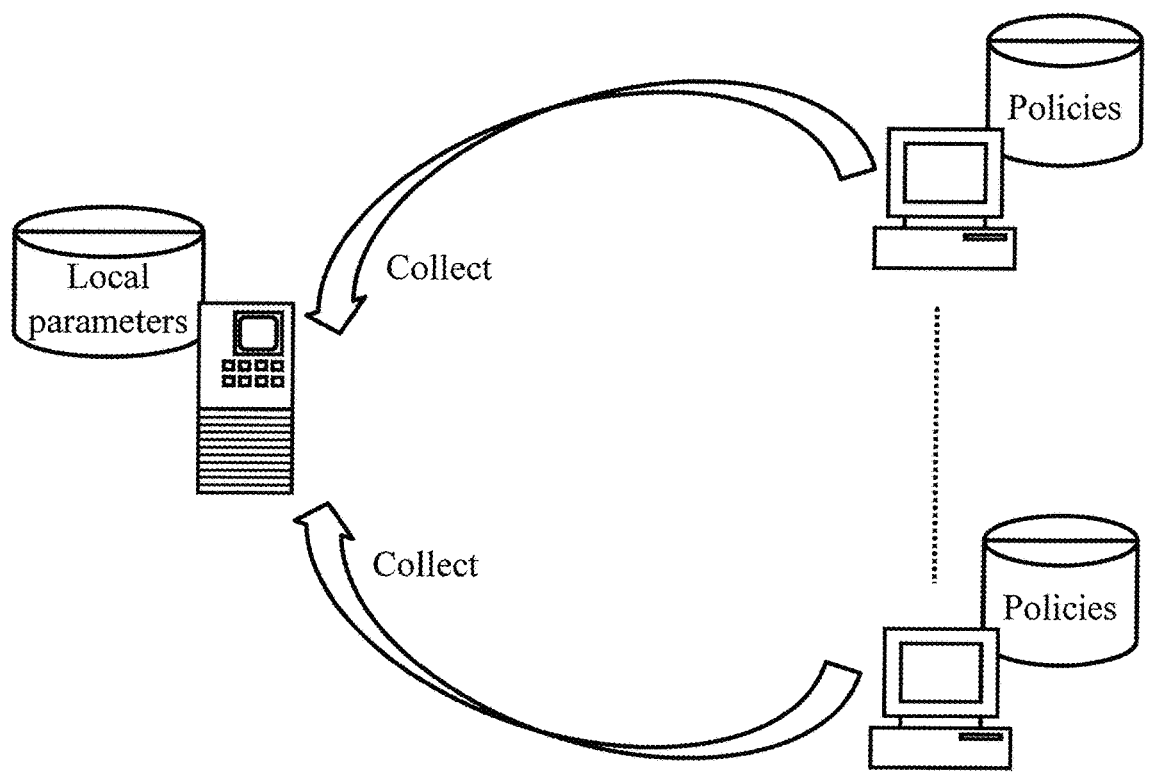
FIG. 1A, depicts distributing policies to a plurality of endpoints of a data processing environment, in accordance with embodiments of the present invention.

FIG. 1A depicts distributing policies to a plurality of endpoints of a data processing environment, in accordance with embodiments of the present invention. In one embodiment, the endpoints may be service servers. Each policy indicates one or more activities to be executed on the endpoints.

According to an embodiment of the present invention, some of the activities are conditioned by a condition that is based on one or more aggregated parameters; each aggregated parameter depends on one or more local parameters of of each endpoint of a group of endpoints. A local parameter is "local" to each endpoint (i.e., specific to each endpoint) of a group of endpoints, and an aggregated parameter aggregates the local parameter and is a function of the local parameter of each endpoint of the group of endpoints. For example, a conditioned activity may indicate the killing of a secondary process when the average processing power, of a group of endpoints offering a same service, exceeds a threshold, wherein the local parameter is the processing power of each endpoint and the aggregated parameter is the average processing power of the group of endpoints which may be computed as an arithmetic average (e.g., unweighted average, weighted average, etc.) of the local processing powers. The local parameters are collected from the corresponding endpoints (for example, by an aggregation service of the data processing environment at collects processing the power usage of each endpoint of the group).

Figure 1B:
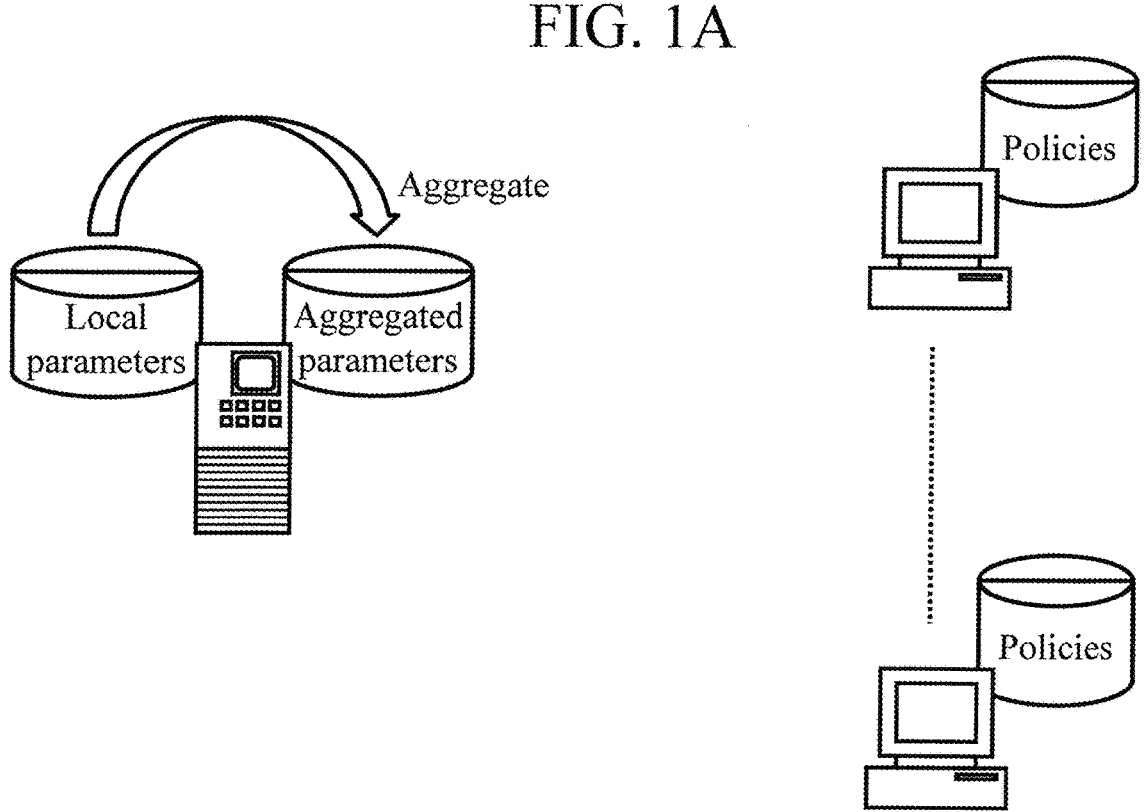
FIG. 1B depicts local parameters aggregated into aggregated parameters, in accordance with embodiments of the present invention.

FIG. 1B depicts local parameters aggregated into aggregated parameters, in accordance with embodiments of the present invention. For example, the aggregation into the aggregated parameters may be performed by the aggregation service that calculates the average processing power usage of the endpoints of the group).

Figure 1C:
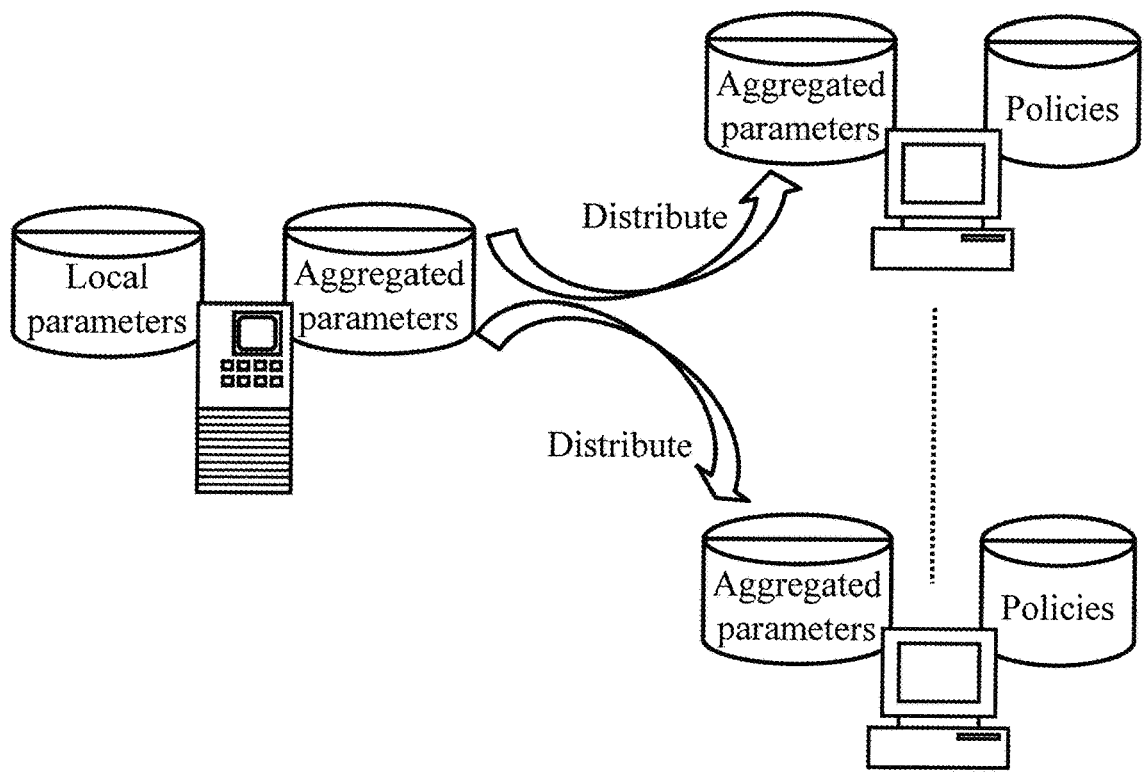
FIG. 1C depicts each aggregated parameter distributed to corresponding endpoints, in accordance with embodiments of the present invention.

FIG. 1C depicts each aggregated parameter distributed to corresponding endpoints, in accordance with embodiments of the present invention. Each policy comprising any activity conditioned on the aggregated parameter is to be applied, for example, by the aggregation service that transmits the aggregated parameter to a control server of the data processing environment, which in turn uploads the aggregated parameter to a local storage of the corresponding endpoints.

Figure 1D:
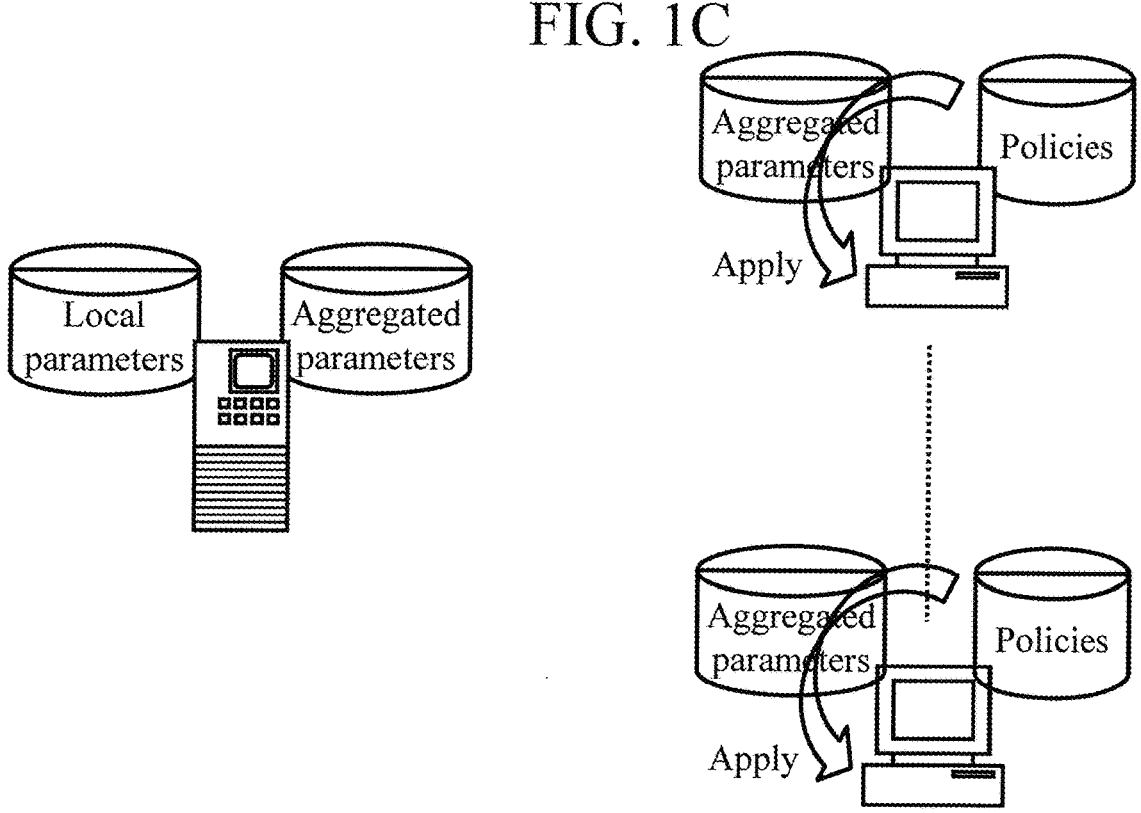
FIG. 1D depicts each endpoint applying the corresponding policies as usual, in accordance with embodiments of the present invention.

FIG. 1D depicts each endpoint applying the corresponding policies as usual, in accordance with embodiments of the present invention. In one embodiment, the endpoint collects any global parameter of each policy on the endpoint and then executes the activities of the policy accordingly; i.e., by verifying a condition and then executing the activity only when the condition is fulfilled. For example, the endpoint may read the average processing power of the group of endpoints from the local storage and then kill the secondary process if the average processing power of the group of endpoints exceeds the threshold.

As a result of verifying the activity's condition and then executing the activity or the condition is fulfilled, the endpoints now become aware of the state of the whole data processing environment of the endpoints. The information that is available to the endpoints is extended allowing the endpoints to leverage not only information that is accessible directly on the endpoints but also more general information (normally not accessible by the endpoints) that is collected and aggregated externally, which significantly increases the possibility of defining complex and structured conditions, thereby making the activities that may be executed on the endpoints (to remedy non-compliance of the endpoints with the corresponding policies) more granular and effective.

The above-mentioned result (i.e., making the activities that may be executed on the endpoints more granular and effective) is achieved without substantially undermining the policy-based paradigm. Indeed, the application of the corresponding policies on each endpoint is still directly controlled by each endpoint, which maintains the workload distributed throughout the endpoints, with control of the endpoints that remains scalable and reactive (and focused on the definition of the policies at a global level instead of on the control of the endpoints at an individual level).

Figure 2:
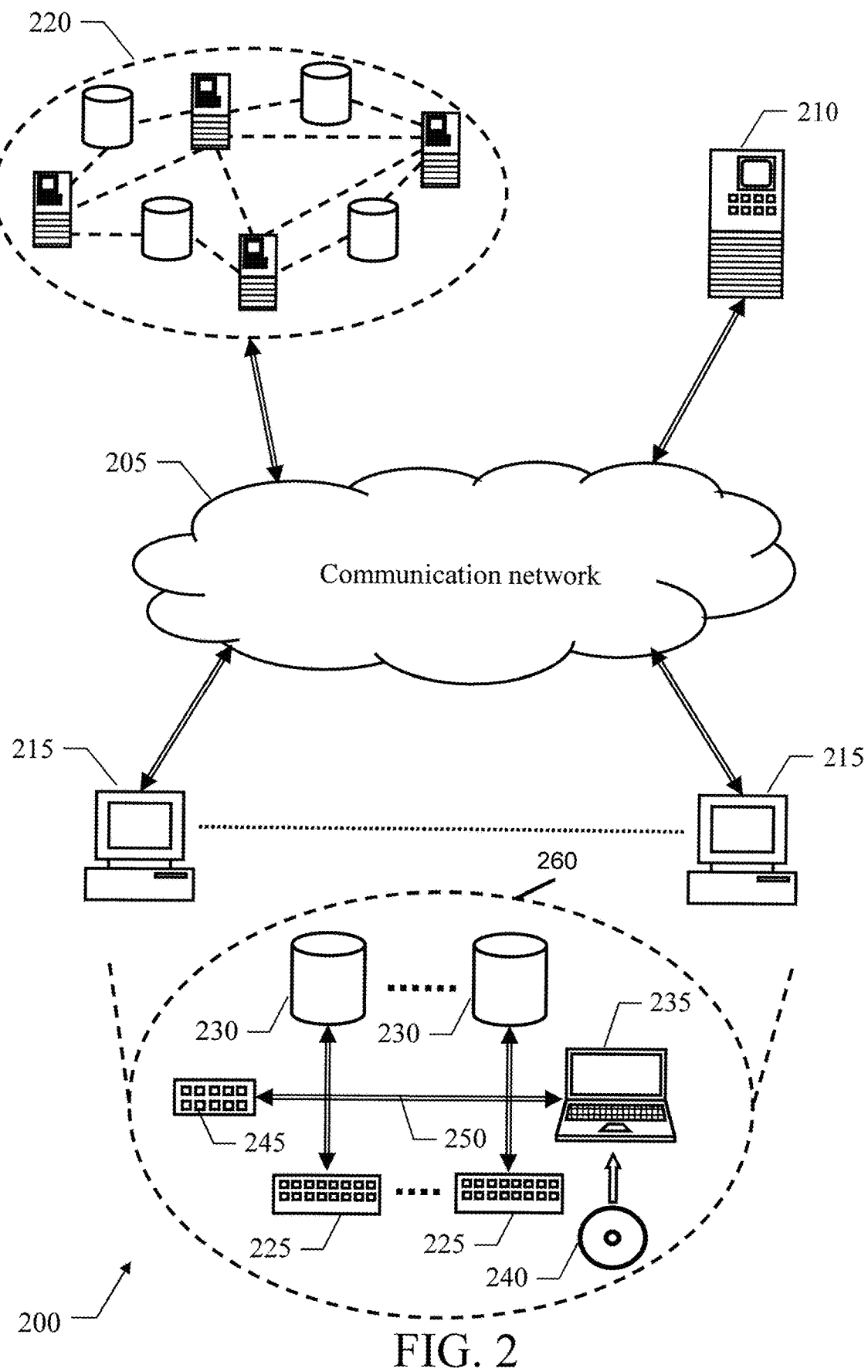
FIG. 2 is a schematic block diagram of a data processing environment, in accordance with embodiments of the present invention.

FIG. 2 is a schematic block diagram of a data processing environment 200, in accordance with embodiments of the present invention.

The data processing environment 200 has a distributed architecture based on a communication network 205 (for example, the Internet). Several computing machines (for example, implemented in one or more data centers), are connected to the communication network 205. One of the computing machines (or more), referred to as control server 210, controls a plurality of other computing machines, referred to as endpoints or targets, 215 (according to a policy-based paradigm).

In the solution according to an embodiment of the present invention, the control server 210 accesses a cloud provider 220 (or more) that is connected to the communication network 205 as well. The cloud provider 220 is an entity having one or more cloud nodes (for example, implemented by server computing machines, or simply servers, of one or more data centers) that supply a pool of hardware and/or software computing resources as cloud services; i.e., shared computing resources that may be allocated, configured and released very rapidly and whose actual implementation is completely concealed. The computing resources of the cloud services (generally of the virtual type; i.e., emulations by software of physical resources) are supplied upon request by providing sole control of these computing resources, which may then be used exactly as if they were dedicated. For example, the cloud provider 220 is based on a private cloud deployment model (for the control server 210 only). As far as relevant to the present invention, the cloud services comprise a software application, implementing an aggregation, or reporting, service (aggregating the local parameters into the aggregated parameters for use by the control server 210), which, in one embodiment, may be supplied according to a Software As a Service, or SAS, service model.

Each data center 260 representative of the control server 210, the endpoints 215 and the cloud provider 220 comprises several computing units 225 (for example, of the rack or blade type) and storage units 230 (for example, of the RAID type) implementing mass-memories thereof. Each computing unit 225 comprises one or more microprocessors (μP) controlling operation of: each computing unit 225, a non-volatile memory (ROM) storing basic code for a bootstrap thereof, and a volatile memory (RAM) used as a working memory by the microprocessors (not in FIG. 2). The data center 260 also comprises a console 235 for controlling the data center 260 (for example, a personal computer, also provided with a drive for reading/writing removable storage units 240, such as optical disks like DVDs). A switch/router sub-system 245 controls any communications among the computing units 225, the storage units 230 and the console 235, and with the communication network 205. The computing units 225, the storage units 230 and the console 235 are connected to the switch/router sub-system 245 through a cabling sub-system 250.

Figure 3:
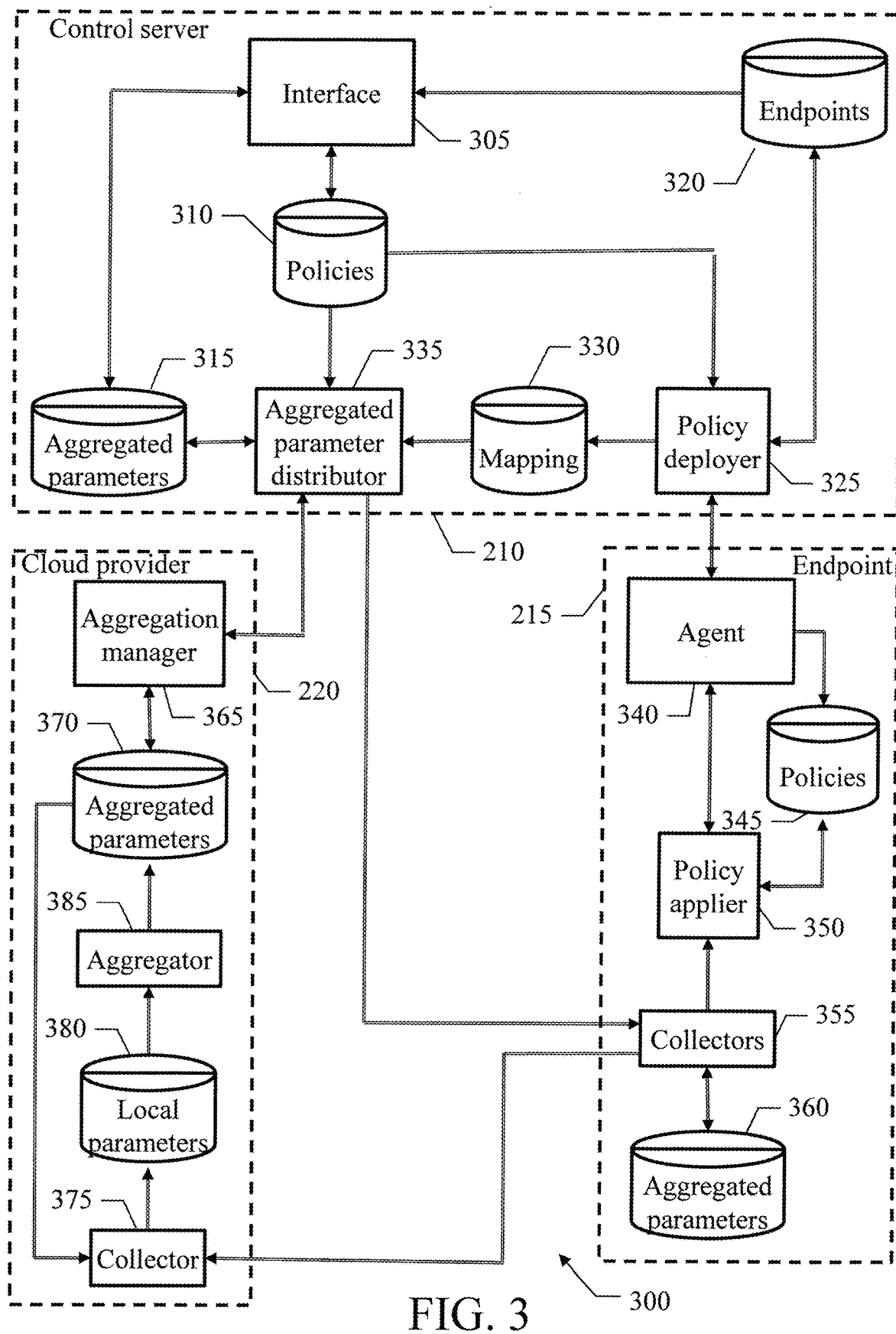
FIG. 3 depicts main software components that may be used to implement embodiments of the present invention.

FIG. 3 depicts software components that may be used to implement embodiments of the present invention.

All the software components (programs and data) are denoted as a whole with the reference 300. The software components are typically stored in the mass memory and loaded (at least partially) into the working memory of each computing machine of the above-described data processing environment when the programs are running, together with an operating system and other application programs (not shown in FIG. 3). The programs are initially installed into the mass memory, for example, from removable storage units or from the communication network. In this respect, each program may be a module, segment or portion of code, which comprises one or more executable instructions for implementing the specified logical function.

In one embodiment, a tool conforming to the policy-based paradigm comprises a server-side component running on the management server 210 and an endpoint-side component running on each endpoint 215.

Starting from the server-side component (on the control server 210), the software components in FIG. 3 comprise the following software components. An interface 305 (for example, of the GUI type) is used to control the endpoints 215, by accessing (in read/write mode) a global policy repository 310 and a global aggregated parameter repository 315. The global policy repository 310 stores the definition of one or more policies that are available to control the endpoints 215. The policies are defined at high level, independently of an actual implementation of the endpoints 215. In one embodiment, each policy indicates an applicability rule (called relevance), which defines the endpoints 215 on which the policy has to be applied (for example, requiring a specific operating system, a minimum microprocessor frequency). Moreover, the policy indicates a controlled sequence of activities that is to be executed on the corresponding (relevant) endpoints 215 to make the endpoints 215 compliant with the policy. Particularly, the policies may be of one-shot type when each endpoint remains compliant with the policy once the endpoint's activities have been executed thereon (for example, in case of configuration activities aimed at configuring the endpoint, such as by installing a software program, a patch). Conversely, the polices may be of continuous type when the compliance with the policy changes over time (for example, in case of remediation activities aimed at remedying any critical state of the endpoint, such as by killing or relocating a process in order to maintain a desired level of performance). Some of the activities (and especially activities of the policies of the continuous type) are conditioned by a condition that is based on one or more parameters. The parameters may be local when the parameters are defined by metrics of corresponding hardware or software characteristics of the endpoint 215 where the policy is applied. For example, the local properties may measure the performance of the endpoint 215 (such as an average response time of a software application running on the endpoint), the workload of the endpoint 125 (such as a current number of users of the software application), the resource usage of the endpoint 215 (such as the endpoint's processing power usage), the location of the endpoint 215 (such as the endpoint's GPS coordinates), the user behavior of the endpoint 125 (such as the type of requests submitted by the endpoint's users). The parameters may instead be aggregated when the parameters depend on one or more local parameters of a corresponding group of (multiple) endpoints 215. The group of endpoints 215 may be defined either statically (such as all the endpoints 215 of a specific data center) or dynamically according to one or more corresponding local parameters (such as all the endpoints 215 whose location is in a specific geographical area, such as a city). The global aggregated parameter repository 315 stores a definition of each aggregated parameter (indicating how each aggregated parameter is calculated from the local parameters of the group of endpoints) and each aggregated parameter's current value. The interface 305 also accesses (in read mode) an endpoint repository 320, which stores state information of each endpoint 215. In one embodiment, the state information indicates characteristics of the endpoints 215 used to determine the policies to be applied to the endpoints 215 (for example, the endpoint's operating system and microprocessor frequency retrieved by an inventory process), the policies that have been deployed to the endpoint 215 and the endpoint's compliance with the policies (i.e., whether the application of each policy has succeeded or failed). The interface 305 may be used by a system administrator to maintain (i.e., create, update, delete) the definition of the policies and of the aggregated parameters, and to inspect the state information of the endpoints 215.

A policy deployer 325 is used to deploy the policies to the corresponding endpoints 215 (for example, via an ad-hoc deployment infrastructure, not shown in FIG. 3). For this purpose, the policy deployer 325 accesses (in read mode) the global policy repository 310 and accesses (in read/write mode) the endpoint repository 320. The policy deployer 325 as well exposes a user interface (for example, a GUI), which may be used by the system administrator to enforce the deployment of the policies (for example, according to a plan).

The policy deployer 325 further accesses (in write mode) a mapping table 330. The mapping table 330 stores a mapping of each aggregated parameter to the corresponding endpoints, wherein each policy comprising any activity conditioned on the aggregated parameter is to be applied. An aggregated parameter distributor 335 is used to distribute the current value of the aggregated parameters to the corresponding endpoints 215. For this purpose, the aggregated parameter distributor 335: accesses (in read mode) the policy repository 310, accesses (in read/write mode) the global aggregated parameter repository 315, and accesses (in read mode) the mapping table 330.

Moving to the endpoint-side component (on the endpoint 215), the software components in FIG. 3 comprise the following software components. An agent 340 is used to control the application of the corresponding policies on the endpoint 215, by interacting with the policy deployer 325 and accessing (in write mode) a local policy repository 345. The local policy repository 345 stores the definition of the corresponding policies that are to be applied to the endpoint 215 and to the endpoint's compliance with the corresponding policies. The agent 340 interacts with a policy applier 350, which is used to apply the policies on the endpoint 215 (by enforcing the activities of the endpoint 215). For this purpose, the policy applier 350 accesses (in read/write mode) the local policy repository 345 and it exploits one or more collectors 355. The collectors 355 (referred to as local collectors) are used to collect the current value of corresponding local parameters (for example, by calling an Application Program Interface (API) of the operating system). According to an embodiment of the present invention, a specific collector 355 (referred to as aggregated parameter collector) is likewise used to collect the current values of the corresponding aggregated parameters, conditioning the activities of the policies to be applied on the endpoint 215. The aggregated parameter collector 355 accesses (in read/write mode) a local aggregated parameter repository 360 which stores the current values of the corresponding aggregated parameters.

The aggregation service of the cloud provider 220 is implemented by the following components. An aggregation controller 365 is used to provide the current values of the aggregated parameters. The aggregation controller 365 interacts with the aggregated parameter distributor 335 (of the control server 210), which in turns interacts with the aggregated parameter collector 355 (of each endpoint 215). Moreover, the aggregation controller 365 accesses (in read/write mode) a service aggregated parameter repository 370. A service collector 375 is used to collect the current values of the local parameters required for calculating the aggregated parameters. For this purpose, the service collector 375 exploits the local collectors 355 of the corresponding endpoints 215 and accesses (in read mode) the service aggregated parameter repository 370. Moreover, the service collector 375 accesses (in write mode) a local parameter repository 380. The local parameter repository 380 stores the values of the local parameters that have been collected over time from the corresponding endpoints 215 (for example, in the last month). An aggregator 385 is used to aggregate the local parameters into the aggregated parameters. For this purpose, the aggregator 385 accesses (in read mode) the local parameter repository 380 and accesses (in write mode) the service aggregated parameter repository 370.

The aggregation service 365-385 allows decoupling the collection of the aggregated parameters from the server-side components 305-335 (which may remain focused on the control of the endpoints 215). As a further improvement, the same aggregation service 365-385 may be exploited by a plurality of server-side components 305-335 (of different tools or of different instances of a same tool) and/or by multiple tenants of each server-side component 305-335, which allows saving computing resources (for collecting the aggregated parameters) and allows sharing the same information among endpoints 215 referring to different server-side components 305-335 or to different tenants of components 305-335.

Figure 4A:
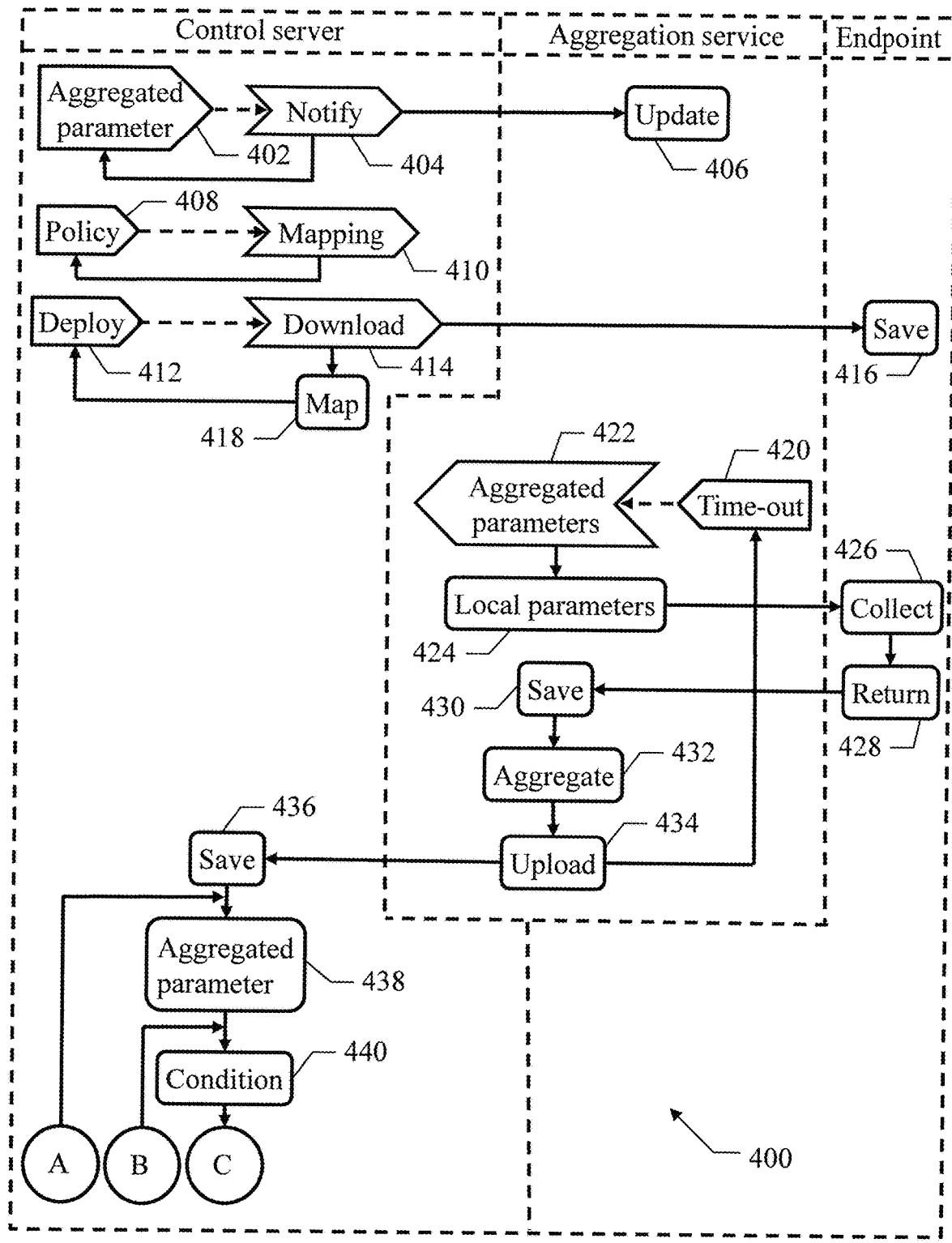
FIGS. 4A-4B activity diagram describing the flow of activities, in accordance with embodiments of the present invention.
Figure 4B:
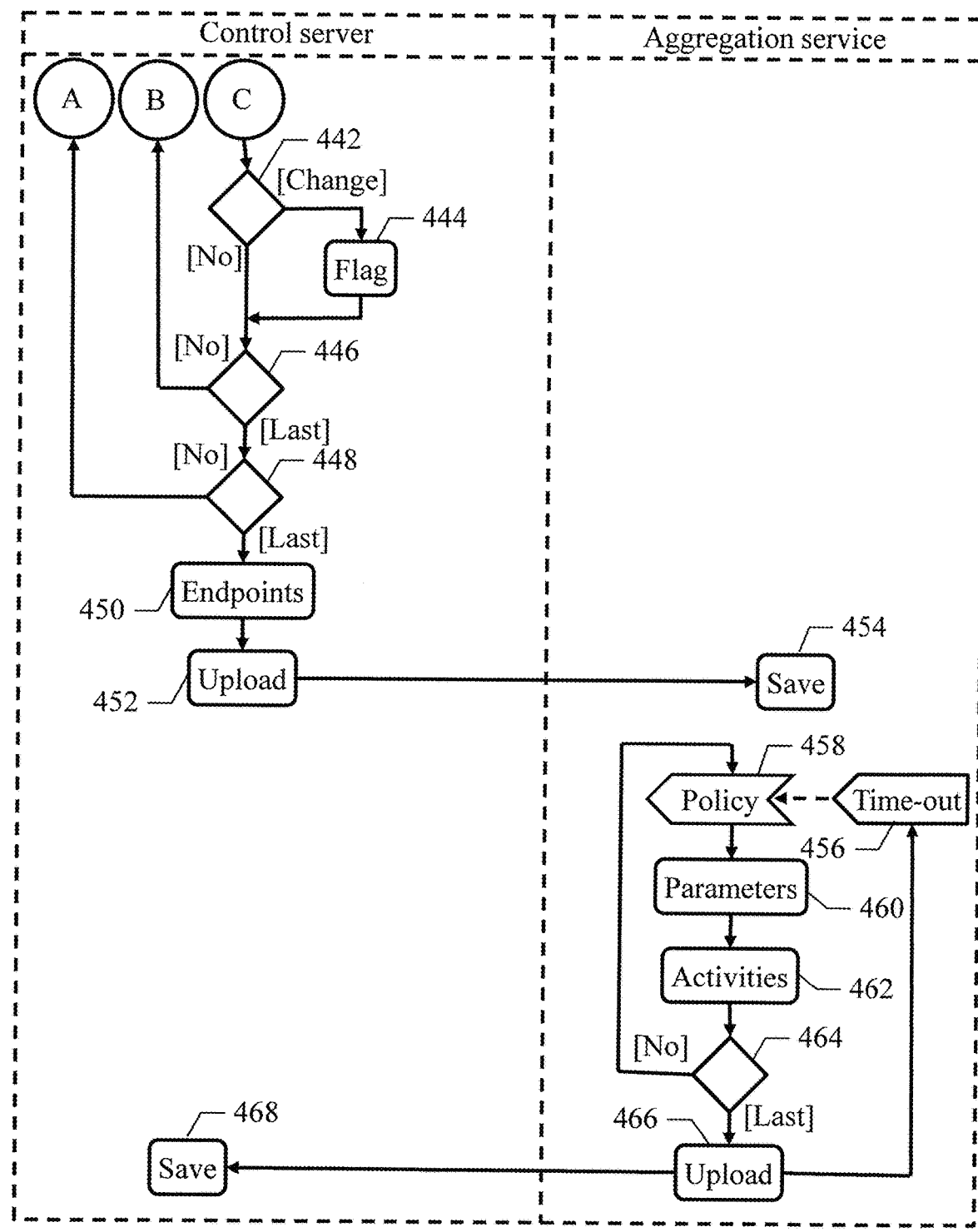

FIGS. 4A-4B depict an activity diagram describing the flow of activities, in accordance with embodiments of the present invention. The activity diagram of FIG. 4 represents an exemplary process that may be used to control the endpoints with a method 400. In this respect, each block in FIGS. 4A-4B may correspond to one or more executable instructions for implementing the specified logical function on the relevant computing machines.

The process passes from block 402 to block 404 in the swim-lane of the control server as soon as the system administrator, through the interface 305, creates a (new) aggregated parameter or updates an (existing) aggregated parameter (i.e., definition of the aggregated parameter) in the global aggregated parameter repository. In response, the aggregated parameter distributor notifies the (new/updated) definition of the aggregated parameter to the aggregation service. The flow of activity then returns to the block 402 waiting for the creation/update of a further aggregated parameter. Moving to block 406 in the swim-lane of the aggregation service, at the same time the aggregation manager updates the service aggregated parameter repository accordingly.

Returning to the swim-lane of the control server, the process passes from block 408 to block 410 as soon as the system administrator, through the interface 305, creates a (new) policy or updates an (existing) policy in the global policy repository. In response thereto, the policy deployer updates the mapping table accordingly. Particularly, for each aggregated parameter of the (new/updated) policy that is not present in the mapping table, a new entry is added for each aggregated parameter. In any case, the policy is associated with each aggregated parameter thereof (if it is necessary). The flow of activity then returns to the block 408 waiting for the creation/update of a further policy.

In a completely independent way, the process passes from block 412 to block 414 as soon as any policies have to be deployed to the corresponding endpoints, the policies determined according to applicability rules of the policies (for example, when an operation is scheduled in a plan). In response, the deployer makes the policies to be deployed available for downloading to the corresponding endpoints (for example, in the deployment infrastructure). Moving to block 416 in the swim-lane of each endpoint (only one endpoint shown in FIG. 4), the agent downloads the corresponding policies (for example, identified by monitoring the deployment infrastructure periodically for availability of the policies) and saves the the policies into the local policy repository. Returning to the swim-lane of the control server, at the same time the process descends from the block 414 to block 418, wherein the policy deployer updates the mapping table accordingly. For each policy that is deployed to a corresponding endpoint, the endpoint is associated with every occurrence of the policy, and then with every aggregated parameter of the policy. The flow of activity then returns to the block 412 waiting for the deployment of any further policies.

In a completely independent way, the process passes from block 420 to block 422 in the swim-lane of the aggregation service as soon as a corresponding time-out expires (for example, every 5-20 seconds). In response thereto, the service collector determines the local parameters and the endpoints to be used for calculating all the aggregated parameters (according to definitions of the local parameters in the service aggregated parameter repository). In one embodiment, for each aggregated parameter, the local parameters and the endpoints are used to define the aggregated parameter, and possibly a group of endpoints are used. For example, an aggregated parameter based on the processing power usage of the servers running a specific software application requires the processing power usage of these servers, whereas an aggregated parameter based on the power processing usage of the smartphones in a specific city requires the position of all the smartphones and the processing power usage of at least the smartphones that are currently in the city. Continuing to block 424, the service collector submits a request of collection of the current value of the corresponding local parameters to each endpoint. Moving to block 426 in the swim-lane of each endpoint (only the same endpoint that is in FIG. 4A), in response thereto each local collector collects the current value of the corresponding local parameter. The local collector then returns the current value of the corresponding local parameter to the aggregation service at block 428. With reference again to the swim-lane of the aggregation service at block 430, the service collector saves the value of each local parameter into the corresponding repository as soon as the value of each local parameter is received from the endpoint (with a FIFO policy). The process continues to block 432 once the current value of all the local parameters have been received (or in any case after a predefined time-out). At this point, the aggregator calculates the current value of each aggregated parameter. For this purpose, at first the corresponding group of endpoints is determined. The (static) group of endpoints is retrieved directly from the definition of the aggregated parameter or the (dynamic) group of endpoints is determined according to the values of the corresponding local parameters indicated in the definition of the aggregated parameter (for example, the smartphones having their position within a specific city). The dynamic definition of the groups of endpoints adds a further degree of flexibility, by allowing defining the endpoints used to calculate the aggregated parameters as well in real-time, which enriches the possibilities of conditioning the activities, especially in particular situations (for example, in case of endpoints implemented by mobile devices). Each aggregated parameter is then calculated according to the values of the local parameters of the endpoints of the group of endpoints. In one embodiment, the aggregated parameter may be based on the current values of the local parameters; i.e., the last values that have been collected (for example, the percentage of the endpoints having their processing power usage exceeding a threshold). In addition or in alternative, the aggregated parameter may be based on a distribution of the values of the local parameters that have been collected over time (for example, the average of the processing power usage of the local parameters in the last hour). Continuing to block 434, the aggregator uploads the values of the aggregated parameters so determined to the control server. The flow of activity then returns to the block 420 waiting for a next expiration of the time-out.

With reference again to the swim-lane of the control server at bock 436, the aggregated parameter distributor saves the (new) values of the aggregated parameters received from the aggregation server into the global aggregated parameter repository (by replacing the previous values of the aggregated parameters, after saving the the previous values into a temporary variable). A loop is then entered for processing these aggregated parameters. The loop begins at block 438, wherein the aggregated parameter distributor takes a (current) aggregated parameter into account (starting from a first aggregated parameter in any arbitrary order). The aggregated parameter distributor then analyzes a (current) condition of a (current) policy based on the aggregated parameter at block 440 (starting from a first aggregated parameter in any arbitrary order, as indicated in the mapping table and in the global policy repository). The flow of activity branches at block 442. If the new value of the aggregated parameter has changed significantly with respect to the previous value of the aggregated parameter, the process descends into block 444, which happens when the change of the aggregated parameter affects the condition; i.e., the aggregated parameter changes its evaluation (for example, in a condition based on the comparison of the aggregated parameter with a threshold when the aggregated parameter passes from lower than to higher than the threshold, or vice-versa). In this case, the aggregated parameter distributor flags the aggregated parameter for distribution. The process then descends into block 446. The same point (i.e., block 446) is also reached directly from the block 442 if no significant change of the aggregated parameter has occurred. In both cases of reaching block 446, a test is now made wherein the aggregated parameter distributor verifies whether a last condition of all the policies has been taken into account. If not, the flow of activity returns to the block 440 to repeat the same operations for a next condition. Conversely, another test is performed at block 448, wherein the aggregated parameter distributor verifies whether a last aggregated parameter has been taken into account. If not, the flow of activity returns to the block 438 to repeat the same operations for a next aggregated parameter. Conversely, the loop is exited by descending into block 450. At this point, the aggregated parameter distributor identifies the endpoints that are mapped to each aggregated parameter being flagged for distribution (as indicated in the mapping table). The mapping of the aggregated parameters to the corresponding endpoints makes this operation very fast, so that the impact of the mapping on the performance of the control server is negligible. The aggregated parameter distributor then uploads the new values of the (flagged) aggregated parameters to the corresponding endpoints so identified at block 452. In this way, the distribution of the aggregated parameters to the corresponding endpoints is performed only when it is actually necessary (for the application of the policies), so as to limit the traffic on the communication network. Moving to block 454 in the swim-lane of each endpoint (only the same endpoint as shown in FIG. 4A), the aggregated parameter collector saves the new values of the aggregated parameters that have been uploaded into the local aggregated parameter repository.

In a completely independent way, the process passes from block 456 to block 458 in the swim-lane of each endpoint (only the same endpoint as shown in FIG. 4A) as soon as a corresponding time-out expires (for example, every 1-5 seconds). In response, a loop is entered for applying the corresponding policies on the endpoint; i.e., all the policies of continuous type (whose compliance therewith has to be monitored over time) and the policies of one-shot type with which the endpoint is not compliant yet (as indicated in the endpoint repository). The loop begins with the policy applier that takes a (current) one of these policies into account by extracting the policy's definition from the local policy repository (starting from a first policy in any arbitrary order). Continuing to block 460, the policy applier collects the values of any (local and/or aggregated) parameters of the policy by calling the corresponding (local and/or aggregated parameter) collectors. In case of any aggregated parameters, the aggregated parameter collector reads the value of the aggregated parameter from the local aggregated parameter repository, so that the addition of the aggregated parameters is completely opaque to the policy applier. In other words, the aggregated parameters are just an additional source of information for the policy applier (which is updated by the control server every time the policy changes). The policy applier then enforces the activities of the policy on the endpoint at block 462. For this purpose, the policy applier controls the execution in succession of the policy's activities (suitably translated into actual commands that are recognized by the endpoint), according to any local/aggregated parameters thereof. For example, a configuration activity may involve the downloading of a software application package and its installation if the average response time of the software application in the endpoints of the group is higher than 1-2 seconds. On the other hand, a remediation activity may involve the relocation of a process running on the endpoint to another endpoint when the power processing usage of more than 50% of the endpoints of the group exceeds 90% or the killing of the same process when the power processing usage of more than 70% of the endpoints of the group exceeds 50%.

The preceding exemplary configuration activity and remediation activity are examples of activities that improve operation of a computer system comprising a group of endpoints, by implementing rules specified in the policy. The rules pertain to the aggregated parameters for the group of endpoints. The preceding configuration activity of downloading a software application package and its installation is performed upon satisfaction of the following rule: the average response time of the software application in the endpoints of the group is higher than 1-2 seconds, wherein the local parameter is the response time of each endpoint of the group of endpoints and the aggregate parameter is the average response time of the group of endpoints. The preceding remediation activity of relocating a process running on the endpoint to another endpoint is performed upon satisfaction of one of the following rules: (i) the power processing usage of more than 50% of the endpoints of the group exceeds 90%; or (ii) the killing of the same process when the power processing usage of more than 70% of the endpoints of the group exceeds 50%, wherein the local parameter is the power processing usage of each endpoint of the group of endpoints and the aggregate parameter is the power processing usage of (i) 50% or (ii) 70% of the endpoints.

In any case, the policy applier saves a result of the application of the policy into the local policy repository (with any activities thereof that is rolled-back in case of failure of the policy so as to restore the state of the endpoint preceding its application). A test is now made at block 464, wherein the policy applier verifies whether a last policy has been applied. If not, the process returns to the block 458 to repeat the same operations for a next policy. Conversely, once all the policies have been applied, the loop is exited by descending into block 466. At this point, the policy applier uploads the results of the application of the policies to the control server. The flow of activity then returns to the block 456 waiting for a next expiration of the time-out. With reference again to the swim-lane of the control server at bock 468, at the same time the policy deployer updates the endpoint repository accordingly.

In order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling a plurality of endpoints in a data processing environment. However, the endpoints may be in any number and of any physical and/or virtual type (for example, clients, servers, PCs, smartphones, tablets, virtual machines); moreover, the endpoints may be provided in any data processing environment (for example, based on multiple physical machines connected to any communication network such as the Internet or a LAN, or based on a single computing system hosting multiple virtual machines).

In an embodiment, the method comprises storing one or more policies. However, the policies may be stored anywhere (for example, in a separate depot). Moreover, the policies may be in any number and of any type (for example, of one-shot and/or continuous type for performance management, software product installation/maintenance, software license control, security vulnerability detection/remediation).

In an embodiment, each policy comprises an indication of one or more activities for execution on one or more corresponding endpoints. However, the activities may be in any number and of any type (for example, APIs, scripts, executable programs for killing/relocating processes, changing operative characteristics such as microprocessor frequency, adding virtual disks, installing/maintaining software applications, downloading/uploading data, acquiring license entitlements); moreover, the activities are for execution on any number and type of endpoints (for example, all the endpoints indiscriminately or only the relevant endpoints determined in any way, either at the level of the control server or of each endpoint).

In an embodiment, at least one of the activities of the policies is conditioned by a condition based on one or more aggregated parameters. However, the conditions based on the aggregated parameters may be in any number and of any type (for example, combined with any operators such as AND, OR). Moreover, the conditions may be defined at the level of either each activity or the whole policy.

In an embodiment, each aggregated parameter depends on one or more local parameters of a corresponding group of a plurality of the endpoints. However, each aggregated parameter may depends on any number and type of local parameters (for example, relating to characteristics of the whole computing environment, such as number of nodes, network bandwidth of a cloud provider). Moreover, the corresponding group may comprise any number and type of endpoints (for example, defined statically, dynamically or in any combination thereof).

In an embodiment, the method comprises collecting the local parameters from the corresponding endpoints. However, the local parameters may be collected in any way (for example, by invoking APIs, queries, scripts, executable programs in either push or pull mode).

In an embodiment, the method comprises aggregating the local parameters into the aggregated parameters. However, the local parameters may be aggregated in any way (for example, periodically or only when they change).

In an embodiment, the method comprises distributing each aggregated parameter at least to the corresponding endpoints of each policy comprising any activity conditioned on the aggregated parameter. However, the aggregated parameters may be distributed in any way (for example, in push or pull mode) to the corresponding endpoints only (for example, determined centrally or individually be each endpoint) or to all of them indiscriminately.

In an embodiment, the method comprises deploying at least the corresponding policies to the endpoints. However, the policies may be deployed in any way (for example, in push or pull mode) to the corresponding endpoints only (for example, determined centrally or individually be each endpoint) or to all of them (with each endpoint that then verifies its relevance thereto).

In an embodiment, the deployment of the policies causes each endpoint to apply each corresponding policy by collecting any aggregated parameters of the policy on the endpoint and executing the activities of the policy according to the corresponding aggregated parameters. However, the policies may be applied in any way (for example, periodically or as soon the corresponding aggregated parameters change). Moreover, the aggregated parameters may be collected in any way either the same or different with respect to the local parameters).

In an embodiment, at least one of the activities of the policies is conditioned by a further condition based on one or more further local parameters of a current one of the corresponding endpoints wherein the policy is applied. However, the conditions based on the further local parameters may be in any number and of any type (either the same or different with respect to the aggregated parameters), again at the level of each activity or of the whole policy. Moreover, the further local parameters may be in any number and of any type (either the same or different with respect to the local parameters), and the local parameters may be used alone or in any combination with the aggregated parameters.

In an embodiment, deploying at least the corresponding policies causes each endpoint to apply each corresponding policy by collecting any further local parameters of the policy on the endpoint and executing the activities of the policy according to the corresponding further local parameters. However, the further local parameters may be collected in any way (either the same or different with respect to the local parameters and the aggregated parameters).

In an embodiment, distributing each aggregated parameter comprises uploading each aggregated parameter to a local storage of at least the corresponding endpoints. However, the aggregated parameters may be uploaded in any way (either directly or through an interposed module of the endpoints) to any local storage (for example, one or more file, tables, databases).

In an embodiment, deploying at least the corresponding policies causes each endpoint to apply each corresponding policy by reading any aggregated parameters of the policy from the local storage of the endpoint. However, the aggregated parameters may be read in any way (for example, by APIs, queries, scripts, executable programs).

In an embodiment, the method comprises storing a mapping of the aggregated parameters to the corresponding endpoints. However, the mapping may be performed in any way (for example, only when the policies are deployed to the corresponding endpoints or even in real-time only when the aggregated parameters are to be distributed) and the aggregated parameters may be stored in any way (for example, in any memory structure of the mass memory or even of the working memory).

In an embodiment, distributing each aggregated parameter comprises identifying the corresponding endpoints of each aggregated parameter according to the mapping. However, the corresponding endpoints may be identified in any way (for example, by simply querying the endpoint repository).

In an embodiment, distributing each aggregated parameter comprises distributing each aggregated parameter to the corresponding endpoints being identified. However, the aggregated parameters may be distributed in any way to the endpoints so identified (for example, individually or together for each endpoint).

In an embodiment, distributing each aggregated parameter comprises distributing each aggregated parameter in response to a significant change thereof affecting the corresponding condition. However, the aggregated parameters may be distributed in any other way (for example, in response to any change thereof or always indiscriminately).

In an embodiment, aggregating the local parameters comprises calculating the aggregated parameters according to a current value of the corresponding local parameters. However, the aggregated parameters may be calculated in any way according to the current value of the corresponding local parameters (for example, as a number/percentage thereof having any specific property, such as higher or lower than a threshold, as any statistical indicators thereof, such as their mean, median over the group of endpoints).

In an embodiment, aggregating the local parameters comprises, in addition or in alternative, calculating the aggregated parameters according to a distribution of the corresponding local parameters over time. However, the aggregated parameters may be calculated in any way according to the distribution of the corresponding local parameters (for example, as a number/percentage of the occurrences of any specific event, such as the exceeding of a threshold, as any statistical indicators thereof, such as a mean or median of the distribution). In any case, the aggregated parameters may be calculated only according to the current values, only according to the distributions, in additional, different or alternative ways (for example, according to the change between consecutive values of the aggregated parameters) or in any combination thereof.

In an embodiment, the method comprises determining the corresponding group of the endpoints of at least one of the aggregated parameters according to one or more still further local parameters of the endpoints. However, each group of endpoints may be determined in any way according to the still further local parameters, which may be either the same or different with respect to the local parameters used to condition the corresponding activity (for example, combined with any operators such as AND, OR). I In any case, the groups of endpoints may be determined only statically, only dynamically according to the still further local parameters, only dynamically according to additional, different or alternative criteria (for example, the current time, such as working day or week-end) or in any combination thereof.

In embodiment, each local parameter measures performance, workload, resource usage, location and/or user behavior of the corresponding endpoint. However, the local parameters may measure any performance (such as average I/O rate), any workload (such as average number of received requests), any resource usage (such as memory space available), any location (for example, accessed wireless communication network), any user behavior (such as average session length), additional, different or alternative metrics (for example, installed software applications, operative mode such as production or test) or any combination thereof.

In an embodiment, storing one or more policies, distributing each aggregated parameter and deploying at least the corresponding policies are performed by one or more control servers of the data processing environment. However, the control servers may be in any number and of any physical/virtual type (for example, with these functions that are concentrated in a single computing machine or distributed throughout two or more computing machines). In any case, the possibility of implementing one or more of these functions locally on the endpoints is not excluded.

In an embodiment, collecting the local parameters and aggregating the local parameters are performed by one or more aggregation servers of the data processing environment. However, the aggregation servers may be in any number and of any physical/virtual type (for example, with these functions that are concentrated in a single computing machine or distributed throughout two or more computing machines). In any case, the possibility of implementing one or more of these functions by the control servers directly or even locally on the endpoints is not excluded (up to all of the functions without any aggregation server).

In an embodiment, the method comprises providing the aggregated parameters from the aggregation servers to the control servers. However, the aggregated parameters may be provided from the aggregation servers to the control servers in any way (for example, in push or pull mode, either uploading them directly or through an interposed module of the control servers).

In an embodiment, providing the aggregated parameters comprises providing the aggregated parameters from each aggregation server to a plurality of the control servers and/or to a plurality of tenants of each control server. However, the aggregated parameters may be provided from each aggregation server to any number of control servers, to any number of tenants of each control server, to a single tenant of a single control server, or to any combination thereof.

In an embodiment, at least one of the aggregation servers is implemented by a cloud service. However, the cloud service may be of any type (for example, public, private, hybrid). In any case, the possibility of implementing the aggregation servers in any other way is not excluded (for example, in a standard client-server architecture).

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently or interleaved way (at least in part).

An embodiment provides a computer program configured for causing a computing system perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the software program may be implemented as a stand-alone module, as a plug-in for a pre-existing software program (for example, the tool and particularly its server-side component), or even directly in the latter; moreover, the software program may run on any computing system (see below). In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each one of the steps of the above-mentioned method. An embodiment provides a system comprising a circuitry (i.e., any hardware suitably configured, for example, by software) configured for performing each one of the steps of the same method. However, the system may be of any type (for example, based on physical and/or virtual machines connected among them in any way, such as via a local, wide area, global, cellular or satellite network and exploiting any type of wired and/or wireless connections, or even on a stand-alone computing machine), comprising the control server(s) only, the control server(s) and the aggregation server(s) or the control server (s), the aggregation server(s) and the endpoints.

Generally, similar considerations apply if the system has a different structure or comprises equivalent components or it has other operative characteristics. In any case, every component thereof may be separated into more elements, or two or more components may be combined together into a single element. Moreover, each component may be replicated to support the execution of the corresponding operations in parallel. Moreover, unless specified otherwise, any interactivity between different components generally does not need to be continuous, and it may be either direct or indirect through one or more intermediaries.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructures shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
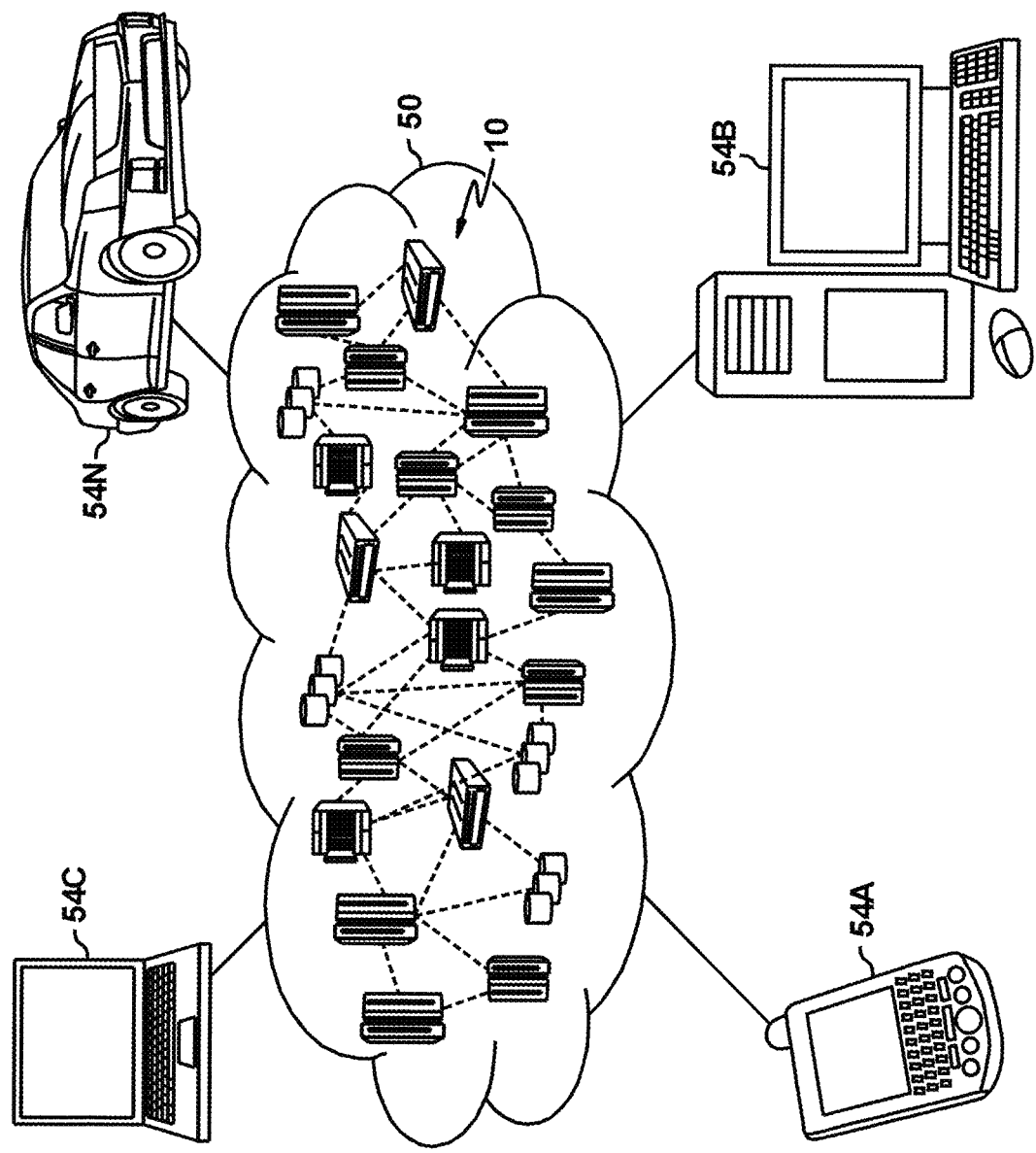
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
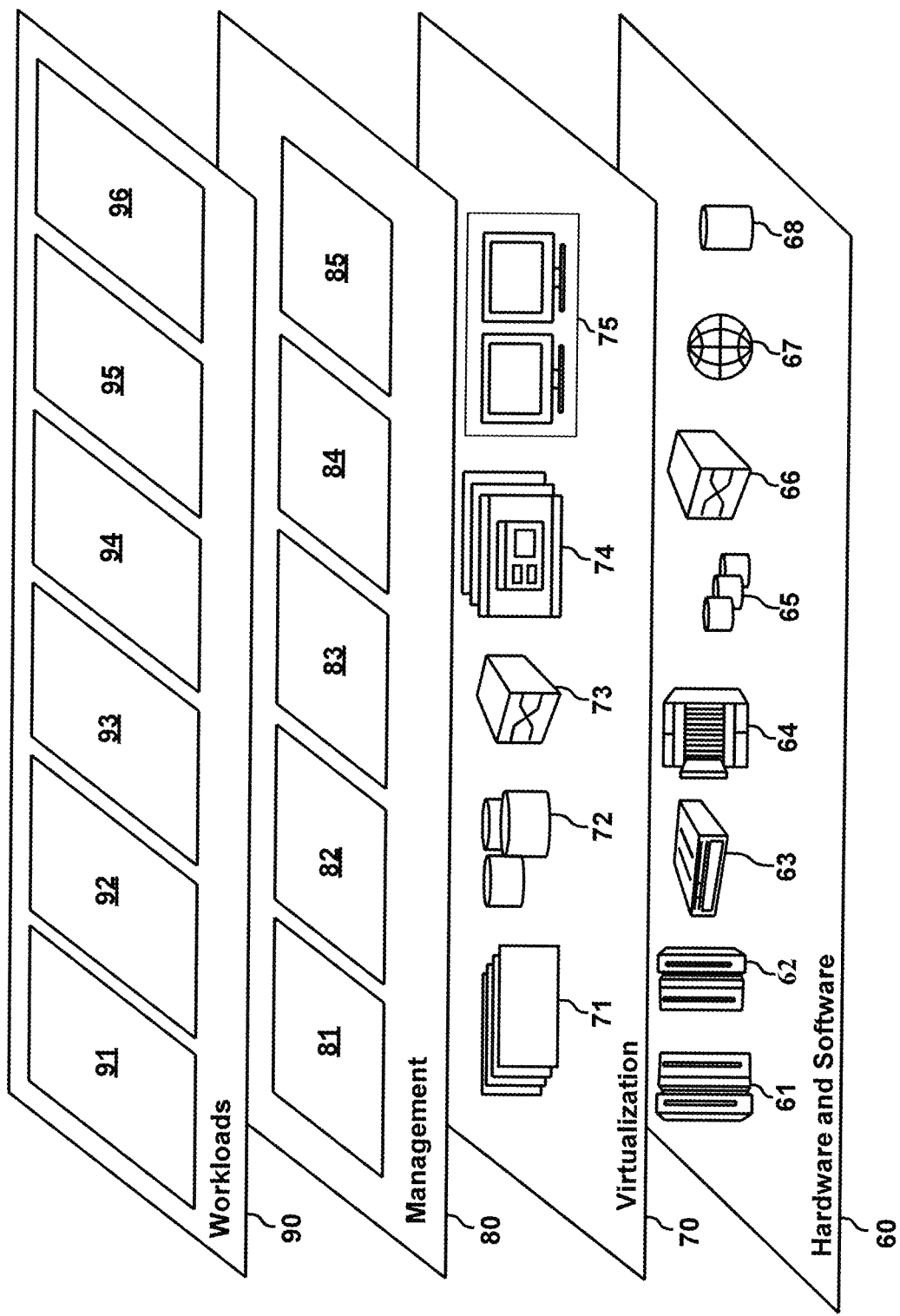
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application se software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an aggregation service 96 configured to use a software application to aggregate local parameters into aggregated parameters for use by the management server 210.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The compute readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:
    collecting, by one or more processors of a computer system, one or more local parameters from one or more corresponding endpoints, each policy of one or more policies comprising an indication of one or more activities for execution on the corresponding endpoints, at least one of the activities of the policies being conditioned by a condition based on one or more aggregated parameters, each aggregated parameter depending on at least one of the one or more local parameters;
    aggregating, by the one or more processors, the local parameters into the aggregated parameters;
    distributing, by the one or more processors, each aggregated parameter at least to the corresponding endpoints of each policy comprising any activity conditioned on the aggregated parameter; and
    sending, by the one or more processors, at least the corresponding policies to the endpoints to cause each endpoint to apply each corresponding policy by collecting any aggregated parameters of the policy on the endpoint and executing the activities of the policy according to the corresponding aggregated parameters.

2. The method of claim 1, wherein at least one of the activities of the policies is conditioned by a further condition based on one or more further local parameters of a current endpoint of the corresponding endpoints wherein the policy is applied, said deploying at least the corresponding policies causing each endpoint to apply each corresponding policy by collecting any further local parameters of the policy on the endpoint and executing the activities of the policy according to the corresponding further local parameters.

3. The method of claim 1, wherein said distributing each aggregated parameter comprises:
    uploading each aggregated parameter to a local storage of at least the corresponding endpoints, said deploying at least the corresponding policies causing each endpoint to apply each corresponding policy by reading any aggregated parameters of the policy from the local storage of the endpoint.

4. The method of claim 1, said method comprising:
storing, by the one or more processors, a mapping of the aggregated parameters to the corresponding endpoints;
said distributing each aggregated parameter comprising:
identifying the corresponding endpoints of each aggregated parameter according to said mapping; and
distributing each aggregated parameter to the corresponding endpoints being identified.

5. The method of claim 1, wherein said distributing each aggregated parameter comprises:
distributing each aggregated parameter in response to a significant change thereof affecting the corresponding condition.

6. The method of claim 1, wherein said aggregating the local parameters comprises:
calculating the aggregated parameters according to a current value of the corresponding local parameters and/or to a distribution of the corresponding local parameters over time.

7. The method of claim 1, said method comprising:
determining, by the one or more processors, the corresponding group of the endpoints of at least one of the aggregated parameters according to one or more still further local parameters of the endpoints.

8. The method claim 1, wherein each local parameter measures performance, workload, resource usage, location and user behavior of the corresponding endpoint.

9. The method of claim 1, wherein said storing one or more policies, said distributing each aggregated parameter and said deploying at least the corresponding policies are performed by one or more control servers of the data processing environment.

10. The method of claim 9, wherein said collecting the local parameters and said aggregating the local parameters are performed by one or more aggregation servers of the data processing environment, said method comprising:
providing, by the one or more processors, the aggregated parameters from the aggregation servers to the control servers.

11. The method of claim 10, wherein said providing the aggregated parameters comprises:
providing the aggregated parameters from each aggregation server to a plurality of the control servers and/or to a plurality of tenants of each control server.

12. The method of claim 11, wherein at least one of the aggregation servers is implemented by a cloud service.

13. A computer program product, comprising one or more computer readable hardware storage devices having computer readable program code stored therein, said program code containing instructions executable by one or more processors of a computer system to implement a method, said method comprising
collecting, by the one or more processors, one or more local parameters from one or more corresponding endpoints, each policy of one or more policies comprising an indication of one or more activities for execution on the corresponding endpoints, at least one of the activities of the policies being conditioned by a condition based on one or more aggregated parameters, each aggregated parameter depending on at least one of the one or more local parameters;
aggregating, by the one or more processors, the local parameters into the aggregated parameters;
distributing, by the one or more processors, each aggregated parameter at least to the corresponding endpoints of each policy comprising any activity conditioned on the aggregated parameter; and
sending, by the one or more processors, at least the corresponding policies to the endpoints to cause each endpoint to apply each corresponding policy by collecting any aggregated parameters of the policy on the endpoint and executing the activities of the policy according to the corresponding aggregated parameters.

14. The computer program product of claim 13, wherein at least one of the activities of the policies is conditioned by a further condition based on one or more further local parameters of a current endpoint of the corresponding endpoints wherein the policy is applied, said deploying at least the corresponding policies causing each endpoint to apply each corresponding policy by collecting any further local parameters of the policy on the endpoint and executing the activities of the policy according to the corresponding further local parameters.

15. The computer program product of claim 13, wherein said distributing each aggregated parameter comprises:
uploading each aggregated parameter to a local storage of at least the corresponding endpoints, said deploying at least the corresponding policies causing each endpoint to apply each corresponding policy by reading any aggregated parameters of the policy from the local storage of the endpoint.

16. The computer program product of claim 13, said method comprising:
storing, by the one or more processors, a mapping of the aggregated parameters to the corresponding endpoints;
said distributing each aggregated parameter comprising:
identifying the corresponding endpoints of each aggregated parameter according to said mapping; and
distributing each aggregated parameter to the corresponding endpoints being identified.

17. A computer system, comprising one or more processors, one or more memories, and one or more computer readable hardware storage devices, said one or more hardware storage device containing program code executable by the one or more processors via the one or more memories to implement a method, said method comprising:
collecting, by the one or more processors, one or more local parameters from one or more corresponding endpoints, each policy of one or more policies comprising an indication of one or more activities for execution on the corresponding endpoints, at least one of the activities of the policies being conditioned by a condition based on one or more aggregated parameters, each aggregated parameter depending on at least one of the one or more local parameters;
aggregating, by the one or more processors, the local parameters into the aggregated parameters;
distributing, by the one or more processors, each aggregated parameter at least to the corresponding endpoints of each policy comprising any activity conditioned on the aggregated parameter; and
sending, by the one or more processors, at least the corresponding policies to the endpoints to cause each endpoint to apply each corresponding policy by collecting any aggregated parameters of the policy on the endpoint and executing the activities of the policy according to the corresponding aggregated parameters.

18. The computer system of claim 17, wherein at least one of the activities of the policies is conditioned by a further condition based on one or more further local parameters of a current endpoint of the corresponding endpoints wherein the policy is applied, said deploying at least the corresponding policies causing each endpoint to apply each corresponding policy by collecting any further local parameters of the policy on the endpoint and executing the activities of the policy according to the corresponding further local parameters.

19. The computer system of claim 17, wherein said distributing each aggregated parameter comprises:
uploading each aggregated parameter to a local storage of at least the corresponding endpoints, said deploying at least the corresponding policies causing each endpoint to apply each corresponding policy by reading any aggregated parameters of the policy from the local storage of the endpoint.

20. The computer system of claim 17, said method comprising:
storing, by the one or more processors, a mapping of the aggregated parameters to the corresponding endpoints;
said distributing each aggregated parameter comprising:
identifying the corresponding endpoints of each aggregated parameter according to said mapping; and
distributing each aggregated parameter to the corresponding endpoints being identified.

* * * * *